United States Patent
Ogata et al.

(10) Patent No.: US 8,191,383 B2
(45) Date of Patent: Jun. 5, 2012

(54) EJECTOR DEVICE AND REFRIGERATION CYCLE APPARATUS USING THE SAME

(75) Inventors: Gouta Ogata, Nisshin (JP); Haruyuki Nishijima, Obu (JP); Etsuhisa Yamada, Kariya (JP); Mika Gocho, Obu (JP); Hideya Matsui, Kariya (JP); Kenta Kayano, Kariya (JP); Teruyuki Hano, Kariya (JP)

(73) Assignee: Denso Corporation, Kariya (JP)

( * ) Notice: Subject to any disclaimer, the term of this patent is extended or adjusted under 35 U.S.C. 154(b) by 565 days.

(21) Appl. No.: 12/380,754

(22) Filed: Mar. 3, 2009

(65) Prior Publication Data
US 2009/0229304 A1 Sep. 17, 2009

(30) Foreign Application Priority Data

Mar. 13, 2008 (JP) ................................ 2008-064664

(51) Int. Cl.
*F25B 1/06* (2006.01)
(52) U.S. Cl. ......................................................... 62/500
(58) Field of Classification Search .................... 62/500, 62/512, 527
See application file for complete search history.

(56) References Cited

U.S. PATENT DOCUMENTS

| | | | |
|---|---|---|---|
| 3,442,093 A | 5/1969 | Rietdijk | |
| 5,505,163 A | 4/1996 | Jameel | |
| 5,778,831 A | 7/1998 | Jameel | |
| 6,042,089 A | 3/2000 | Klein | |
| 6,729,158 B2 | 5/2004 | Sakai et al. | |
| 6,925,835 B2 * | 8/2005 | Nishijima et al. | 62/500 |
| 6,966,199 B2 | 11/2005 | Takeuchi | |
| 6,978,637 B2 * | 12/2005 | Nishijima et al. | 62/500 |
| 7,178,360 B2 | 2/2007 | Ogata et al. | |
| 2002/0000095 A1 | 1/2002 | Takeuchi et al. | |
| 2006/0266072 A1 | 11/2006 | Takeuchi et al. | |

FOREIGN PATENT DOCUMENTS

| | | |
|---|---|---|
| DE | 103 20 840 A1 | 12/2004 |
| JP | 62-184375 | 11/1987 |
| JP | 11-037577 | 2/1999 |
| JP | 2003-014318 | 1/2003 |

(Continued)

OTHER PUBLICATIONS

Search Report and Written Opinion dated Aug. 21, 2009 in corresponding Singapore Patent Application No. 200900979.6.

(Continued)

*Primary Examiner* — Melvin Jones
(74) *Attorney, Agent, or Firm* — Harness, Dickey & Pierce, PLC (57) ABSTRACT

An ejector device includes a nozzle having an inner wall surface defining a circular cross-sectional fluid passage extending from an inlet to a jet port. Furthermore, the fluid passage has a throat portion at a position between the inlet and the jet port, and a passage expanding portion in which the cross-sectional area of the fluid passage is enlarged from the throat portion as toward downstream. The passage expanding portion includes a middle portion in which the inner wall surface is expanded in a fluid flow direction by a first expanding angle, and an outlet portion from a downstream end of the middle portion to the jet port, in which the inner wall surface is expanded in the fluid flow direction by a second expanding angle that is larger than the first expanding angle. The ejector device can be suitably used for a refrigeration cycle apparatus.

31 Claims, 8 Drawing Sheets

FOREIGN PATENT DOCUMENTS

| | | |
|---|---|---|
| JP | 2003-279657 | 10/2003 |
| JP | 2004-044412 | 2/2004 |
| JP | 05-149652 | 4/2004 |
| JP | 2004-116807 | 4/2004 |
| JP | 2007-023966 | 2/2007 |
| JP | 2007-120441 | 5/2007 |

OTHER PUBLICATIONS

Office action dated Feb. 16, 2010 in corresponding Japanese Application No. 2008-064664.
Office action dated Jun. 9, 2010 in corresponding Singapore Application No. 200900979.6.

* cited by examiner

EJECTOR DEVICE AND REFRIGERATION CYCLE APPARATUS USING THE SAME

CROSS REFERENCE TO RELATED APPLICATION

This application is based on Japanese Patent Application No. 2008-064664 filed on Mar. 13, 2008, the contents of which are incorporated herein by reference in its entirety.

FIELD OF THE INVENTION

The present invention relates to an ejector device provided with a nozzle configured to jet a fluid, and a refrigeration cycle apparatus using the ejector device.

BACKGROUND OF THE INVENTION

Conventionally, an ejector device for a refrigerant cycle is described in JP 11-37577A. In the ejector device, upstream and downstream throttle portions are provided in a nozzle body at an upstream side of a jet port of the nozzle body, and a fluid passage is expanded from the downstream throttle portion as a throat portion toward the jet port so that refrigerant is decompressed in the fluid passage and the pressure energy of the refrigerant is converted to the speed energy of the refrigerant. In order to improve nozzle efficiency by converting the pressure energy of the refrigerant to the speed energy thereof, an expanding angle of a passage wall surface of a downstream side portion in the nozzle body is made smaller than an expanding angle of a passage wall surface of an upstream side portion in the nozzle body, thereby restricting a flow separation of the refrigerant from the passage wall surface and a generation of a scroll flow.

However, in the ejector device described in JP 11-37577A, when gas-liquid two-phase refrigerant is introduced into the throat portion of the nozzle body, it is difficult to stably improve the nozzle efficiency.

SUMMARY OF THE INVENTION

In view of the foregoing problems, it is an object of the present invention to provide an ejector device having a nozzle in which a nozzle efficiency can be stably improved even when gas-liquid two-phase refrigerant flows into a throat portion of the nozzle.

It is another objection of the present invention to provide a refrigeration cycle apparatus with an ejector device, in which a nozzle efficiency can be stably improved even when gas-liquid two-phase refrigerant flows into a throat portion of the nozzle while ejector efficiency can be improved.

According to a first aspect of the present invention, an ejector device includes a nozzle having an inner wall surface defining a fluid passage extending from an inlet to a jet port of the nozzle. The fluid passage is a circular shape in a cross section perpendicular to an axial line of the fluid passage. The fluid passage has a throat portion at a position between the inlet and the jet port, at which a cross-sectional area of the fluid passage becomes smallest, and a passage expanding portion in which the cross-sectional area of the fluid passage is enlarged from the throat portion as toward downstream to decompress a fluid flowing into the throat portion. The passage expanding portion includes a middle portion in which the inner wall surface is expanded in a fluid flow direction by a first expanding angle, and an outlet portion from a downstream end of the middle portion to the jet port, in which the inner wall surface is expanded in the fluid flow direction by a second expanding angle that is larger than the first expanding angle. Accordingly, it is possible to increase an expanding ratio of the passage cross-sectional area of the outlet portion to be larger than an expending ratio of the passage cross-sectional area of the middle portion in the nozzle. As a result, the fluid can be easily accelerated in the passage expanding portion of the nozzle, thereby stably improving the nozzle efficiency even when gas-liquid two-phase refrigerant flows into the throat portion of the nozzle.

According to a second aspect of the present invention, an ejector device includes a nozzle having therein a fluid passage extending from an inlet to a jet port of the nozzle. The fluid passage has a throat portion at a position between the inlet and the jet port, at which a cross-sectional area of the fluid passage becomes smallest. The nozzle includes a nozzle body having an inner wall surface, and a needle valve inserted in the fluid passage from the inlet toward the jet port. The inner wall surface of the nozzle body and an outer wall surface of the needle valve are configured to define a passage expanding portion of the fluid passage from the throat portion to the jet port in the nozzle. When the passage expanding portion of the fluid passage is supposed as a virtual fluid passage with a circular cross-sectional area having a diameter corresponding to the fluid passage of the passage expanding portion in respective cross sections of the fluid passage, a passage surface of the virtual fluid passage is enlarged from the throat portion as toward downstream to decompress a fluid flowing into the throat portion. Furthermore, the passage expanding portion includes a middle portion in which the passage surface of the virtual fluid passage is expanded in a fluid flow direction by a first expanding angle, and an outlet portion from a downstream end of the middle portion to the jet port, in which the passage surface of the virtual fluid passage is expanded in the fluid flow direction by a second expanding angle that is larger than the first expanding angle. Accordingly, it is possible to increase an expanding ratio of the passage cross-sectional area of the fluid passage in the outlet portion to be larger than an expending ratio of the passage cross-sectional area of the fluid passage in the middle portion of the nozzle. As a result, the fluid can be easily accelerated in the fluid passage of the passage expanding portion of the nozzle, thereby stably improving the nozzle efficiency even when gas-liquid two-phase refrigerant flows into the throat portion of the nozzle.

In the above-described first and second aspects of the present application, the second expanding angle in the outlet portion may be gradually increased as toward downstream in the fluid flow direction. In this case, the fluid can be more smoothly accelerated on a downstream side of the throat portion in the nozzle, and thereby the nozzle efficiency can be more stably improved. Alternatively, the second expanding angle may be constant in the whole area of the outlet portion of the nozzle. In this case, the outlet portion of the nozzle can be easily formed and checked.

A ratio of the second expanding angle at the jet port of the outlet portion to the first expanding angle may be set equal to or larger than 1.33. In this case, the nozzle efficiency can be more stably improved.

The passage expanding portion of the nozzle may further include an introduction portion provided from the throat portion to an upstream end of the middle portion in the fluid flow direction, and the inner wall surface in the introduction portion or the passage surface of the virtual fluid passage in the introduction portion may be expanded in the fluid flow direction by a third expanding angle that is larger than the first expanding angle. In this case, the fluid can be easily accelerated in the introduction portion of the nozzle, thereby further stably improving the nozzle efficiency. Here, the third expanding angle may be gradually reduced in the introduction portion as toward downstream in the fluid flow direction, or the third expanding angle may be constant in the whole area of the introduction portion.

In addition, the first expanding angle may be constant in the whole area of the middle portion, or the first expanding angle may be gradually increased in the middle portion as toward downstream in the fluid flow direction.

In the above-described second aspect of the ejector device of the present invention, the inner wall surface of the nozzle body may be expanded by an expanding angle that is changed in the fluid flow direction, and the outer wall surface of the needle valve may be tapered toward downstream in the fluid flow direction by a constant taper angle. Alternatively, the inner wall surface of the nozzle body may be expanded in the fluid flow direction by an expanding angle that is constant in the fluid flow direction, and the outer wall surface of the needle valve may be tapered toward downstream in the fluid flow direction by a taper angle that is changed in the fluid flow direction. Alternatively, the inner wall surface of the nozzle body may be expanded by an expanding angle that is changed in the fluid flow direction, and the outer wall surface of the needle valve may be tapered toward downstream in the fluid flow direction by a taper angle that is changed in the fluid flow direction.

The above-described any ejector device of the present invention can be suitably used for a refrigeration cycle apparatus. In this case, the fluid is a refrigerant, and the ejector device further includes a refrigerant suction port from which gas refrigerant is drawn by a jet flow of the refrigerant jetted from the jet port of the nozzle, and a pressure increasing portion in which the refrigerant jetted from the jet port of the nozzle and the refrigerant drawn from the refrigerant suction port are mixed and a pressure of the mixed refrigerant is increased by converting a speed energy of the refrigerant to a pressure energy of the refrigerant. The refrigeration cycle apparatus may further include a compressor configured to compress the refrigerant and to discharge the compressed refrigerant, a refrigerant radiator configured to cool the refrigerant flowing from the compressor, and an evaporator configured to evaporate the refrigerant to be drawn into the refrigerant suction port of the ejector. Accordingly, an ejector efficiency can be improved in the refrigeration cycle apparatus while the nozzle efficiency can be improved.

For example, the refrigeration cycle apparatus may further include a decompression device configured to decompress the refrigerant from the refrigerant radiator into a gas-liquid two-phase refrigerant, and the nozzle is coupled to the decompression device such that the gas-liquid two-phase refrigerant flows into the throat portion of the nozzle from the inlet. Even in this case, the nozzle efficiency can be further improved.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS (First Embodiment)

Figure 1:
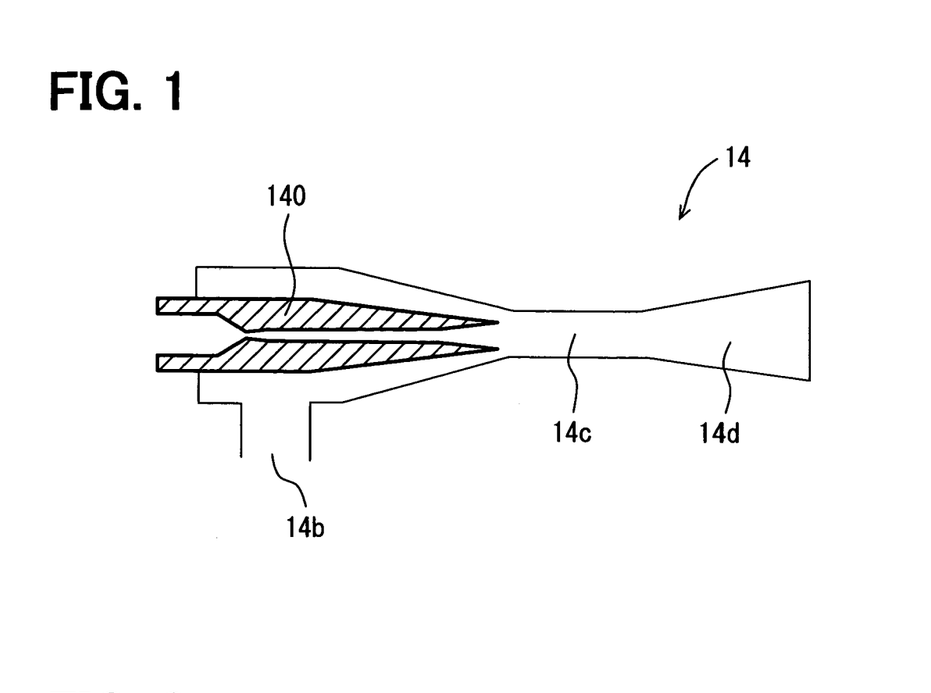
FIG. 1 is a schematic sectional view showing an ejector with a nozzle according to a first embodiment of the present invention.
Figure 2:
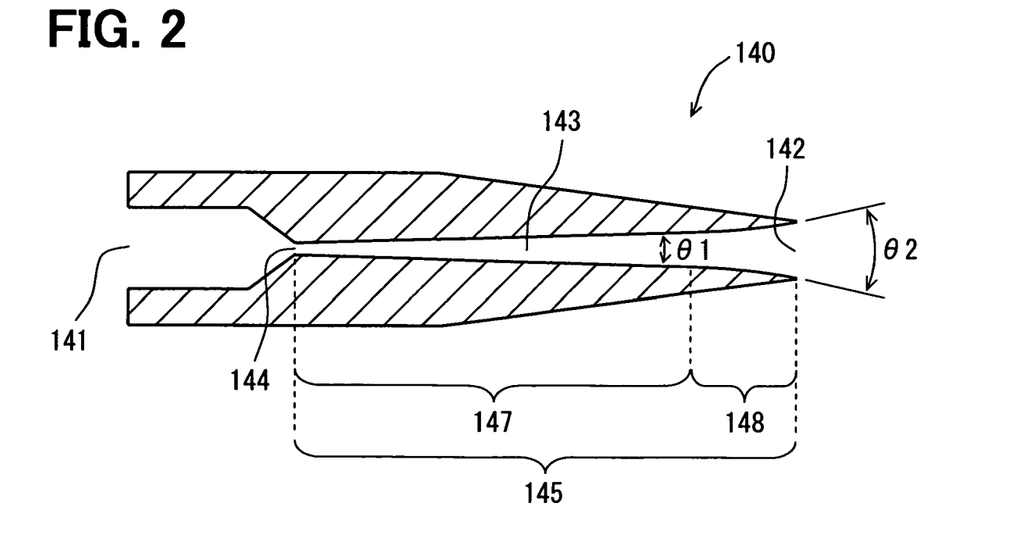
FIG. 2 is a cross-sectional view showing the nozzle according to the first embodiment.
Figure 3:
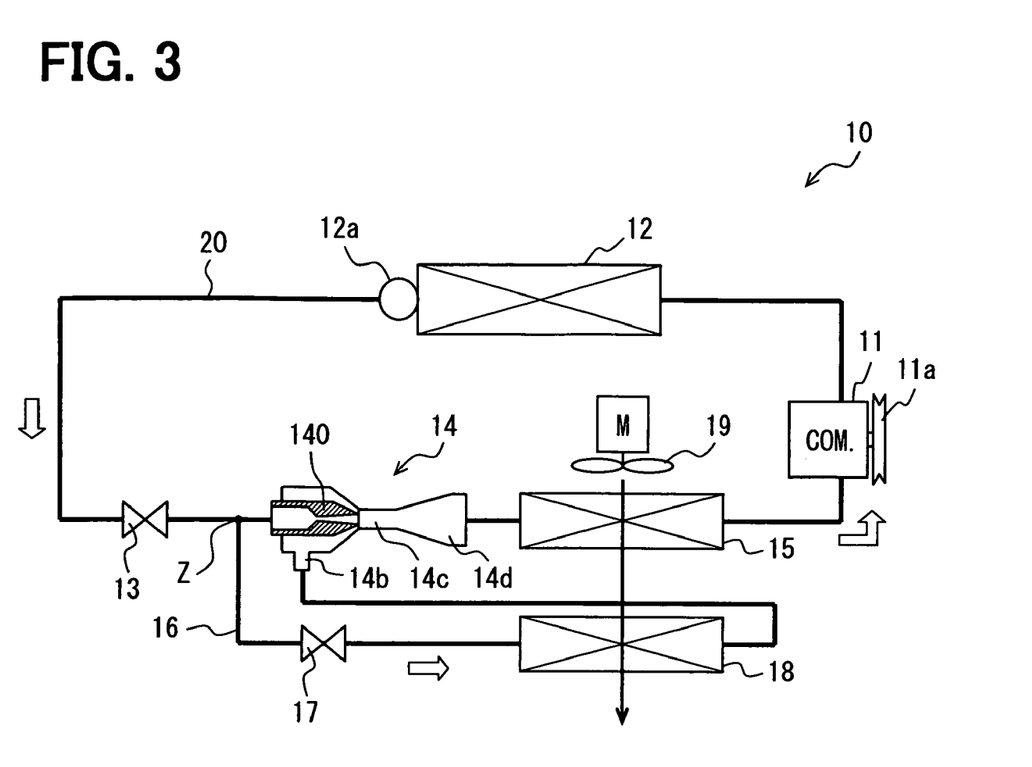
FIG. 3 is a schematic diagram showing a refrigeration cycle apparatus using the ejector.

FIG. 1 shows an ejector 14 that is an example of an ejector device of a first embodiment of the present invention, FIG. 2 shows a nozzle 140 of the ejector 14, and FIG. 3 shows a refrigeration cycle apparatus 10 using the ejector 14.

The refrigeration cycle apparatus 10 shown in FIG. 3 can be used for a vehicle air conditioner, for example. As the refrigerant used in a refrigerant cycle of the refrigeration cycle apparatus 10, a refrigerant such as HFC134a may be used so that a refrigerant pressure on a high-pressure side does not excess the critical pressure of the refrigerant.

In the refrigeration cycle apparatus 10 shown in FIG. 3, a compressor 11 is configured to draw and compress the refrigerant and to discharge the compressed high-pressure and high-temperature refrigerant. The compressor 11 is driven and rotated by a vehicle engine (not shown) via an electro-magnetic clutch 11a, a belt, or the like, as an example.

The compressor 11 may be a variable displacement compressor in which a discharge capacity of the refrigerant can be continuously adjustable, or may be a fixed displacement compressor in which the discharge capacity of the refrigerant can be adjusted by changing a compressor operation rate. For example, in the fixed displacement compressor, the compressor operation rate is changed by interruption of the electro-magnetic clutch 11a. Alternatively, an electrical compressor may be used as the compressor 11 such that the refrigerant discharge capacity of the compressor 11 can be adjusted by adjusting a rotation speed of an electrical motor.

A condenser 12 (refrigerant radiator) used as a heat exchanger for heat radiation such as a refrigerant cooler is disposed at a refrigerant discharge side of the compressor 11. The condenser 12 is configured to perform a heat exchange between the high-pressure refrigerant discharged from the compressor 11 and outside air (i.e., air outside a vehicle compartment) blown by a fan (not shown), thereby cooling the high-pressure refrigerant in the condenser 12.

A liquid receiver 12a is located at a refrigerant outlet side of the condenser 12. The liquid receiver 12a is a gas-liquid separator with a vertically elongated tank. The liquid receiver 12a is configured to separate the refrigerant flowing therein into gas refrigerant and liquid refrigerant, and to store therein surplus liquid refrigerant in the refrigerant cycle. The liquid receiver 12a has a liquid refrigerant outlet at a lower side of the tank so that the liquid refrigerant flows out of the liquid receiver 12 from the liquid refrigerant outlet. As an example of the present embodiment, the receiver 12a is formed integrally with the condenser 12.

A thermal expansion valve 13 is located at a refrigerant outlet side of the liquid receiver 12a. The thermal expansion valve 13 is a decompression device configured to decompress the liquid refrigerant flowing from the receiver 12a. The thermal expansion valve 13 has a temperature sensing portion (not shown) located at a refrigerant suction passage of the compressor 11 so as to detect a super-heat degree of the refrigerant to be drawn into a refrigerant suction port of the compressor 11.

In this embodiment, the refrigerant on the refrigerant suction side of the compressor 11 corresponds to the refrigerant at a refrigerant outlet side of a first evaporator 15. The thermal expansion valve 13 is configured to detect the super-heat degree of the refrigerant on the refrigerant suction side of the compressor 11 based on temperature and pressure of the refrigerant on the refrigerant suction side of the compressor 11, and the valve open degree of the thermal expansion valve 13 is adjusted so that the super-heat degree of the refrigerant on the refrigerant suction side of the compressor 11 is approached to a predetermined value.

As the decompression device for decompressing the high-pressure refrigerant flowing from the condenser 12, the other structure may be used instead of the thermal expansion valve 13. For example, an electrical variable throttle device or a fixed throttle device, or the other type expansion valve may be used as the decompression device.

The elector 14 is located at a refrigerant outlet side of the expansion valve 13. The ejector 14 is adapted as a decompression portion for further decompressing the refrigerant flowing from the expansion valve 13, and as a refrigerant circulation portion for circulating the refrigerant by the suction action of a high-speed refrigerant flow jetted from the nozzle 140.

As shown in FIG. 1, the ejector 14 is provided with the nozzle 140 that is configured to further decompress and expand the refrigerant flowing from the expansion valve 13, and a refrigerant suction port 14b from which gas refrigerant evaporated in a second evaporator 18 is drawn, a mixing portion 14c in which the refrigerant jetted from the nozzle 140 and the refrigerant drawn from the refrigerant suction portion 14b are mixed, and a diffuser portion 14d. The refrigerant suction port 14b is provided on the same space as the jet port of nozzle 140 such that the gas refrigerant flowing out of the second evaporator 18 can be easily drawn by the jet refrigerant flow jetted from a jet port 142 of the nozzle 140.

The mixing portion 14c is provided downstream of the nozzle 140 and the refrigerant suction port 14b in a refrigerant flow so that the refrigerant jetted from the nozzle 140 and the refrigerant drawn from the refrigerant suction portion 14b are mixed in the mixing portion 14c of the ejector 14. The mixed refrigerant in the mixing portion 14c is pressurized in the diffuser portion 14d, and refrigerant after being pressurized in the diffuser portion 14d is discharged from an outlet of the ejector 14. That is, the diffuser portion 14d is a pressure increasing portion in which a passage sectional area is gradually increased toward the outlet of the ejector 14. In the diffuser portion 14d of the ejector 14, the refrigerant flow is decelerated thereby increasing the refrigerant pressure, such that the speed energy of the refrigerant is converted to the pressure energy of the refrigerant.

In the present embodiment, because the refrigerant pressure is also increased in the mixing portion 14c, a pressure increasing portion of the ejector 14 is configured by both the mixing portion 14c and the diffuser portion 14d. Thus, in the pressure increasing portion of the ejector 14, the refrigerant jetted from the jet port 142 of the nozzle 140 and the refrigerant drawn from the refrigerant suction port 14b are mixed and the pressure of the mixed refrigerant is increased by converting the speed energy of the refrigerant to the pressure energy of the refrigerant.

An outlet side of the diffuser portion 14d of the ejector 14 is connected to a refrigerant inlet side of a first evaporator 15, and a refrigerant outlet side of the first evaporator 15 is connected to the refrigerant suction side of the compressor 11.

The compressor 11, the condenser 12, the expansion valve 13, the ejector 14 and the first evaporator 15 are connected by a refrigerant circulation passage 20. A branch passage 16 is branched from a branch portion Z that is located in the refrigerant circulation passage 20 at a position between the refrigerant outlet of the expansion valve 13 and an inlet portion of the nozzle portion 140 of the ejector 14. The branch passage 16 is branched from the branch portion Z at its upstream end, and is joined to the refrigerant suction port 14b of the ejector 14 at its downstream end.

A throttle unit 17 as a throttle mechanism is located in the branch passage 16, and the second evaporator 18 is located in the branch passage 16 at a downstream side of the throttle unit 17. A fixed throttle or a variable throttle may be used as the throttle unit 17. The refrigerant circulation passage 20 and the branch passage 16 are configured by a refrigerant pipe so as to form the refrigerant cycle.

An electrical blower 19 is located at an upstream air side of the first evaporator 15, so as to blow air toward the first evaporator 15 and the second evaporator 18 as shown by the arrow in FIG. 1. Therefore, air blown by the blower 19 is cooled by the first evaporator 15 and the second evaporator 18.

The first and second evaporators 15, 18 are located to cool a common space to be cooled. Therefore, air cooled by the first and second evaporators 15, 18 flows into the common space to be cooled. Among both the first and second evaporator 15, 18, the first evaporator 15 is located upstream of the second evaporator 18 in an air flow direction.

In the present embodiment, because the refrigeration cycle apparatus 10 is used for the vehicle air conditioner, the common space to be cooled is a passenger compartment of the vehicle. However, the refrigeration cycle apparatus 10 may be used for cooling different spaces by using the two evaporators 15, 18. For example, the first evaporator 15 may be located to cool a passenger compartment of a vehicle, and the second evaporator 18 may be located to cool an inner space of a refrigerator mounted to the vehicle. Generally, because the refrigerant pressure is increased in the pressure increasing portion (14c, 14d) of the ejector 14, the refrigerant evaporation pressure and the refrigerant evaporation temperature in the first evaporator 15 are higher than the refrigerant evaporation pressure and the refrigerant evaporation temperature in the second evaporator 18. Therefore, the cooling temperature by the second evaporator 18 can be set lower than the cooling temperature by the first evaporator 15.

As shown in FIG. 2, the nozzle 140 of the ejector 14 has an approximately cylindrical shape, and has therein a fluid passage 143 extending from an inlet 141 to the jet port 142 that is the refrigerant outlet of the nozzle 140. A center line (axial line) of the fluid passage 143 is a straight shape, and respective cross section of the fluid passage 143 perpendicular to the axial line of the fluid passage 143 is a circular shape. That is, the cross sectional area of the fluid passage 143 is changed in the axial direction of the nozzle 140 while having respective circular shape.

A throat portion 144 at which the passage sectional area becomes smallest in the fluid passage 143 is provided at a position in the fluid passage 143 between the inlet 141 and the jet port 142 in the nozzle 140. More specifically, the throat portion 144 is located at a side of the inlet 141 on the left side in FIG. 2, than the jet port 142 on the right side in FIG. 2. The upstream passage part of the fluid passage 143 between the inlet 141 to the throat portion 144 has a taper portion that is tapered so that the passage cross-sectional area in the taper portion is gradually reduced toward the throat portion 144, and the passage cross-sectional area at the throat portion 144 becomes smallest. The downstream passage part of the fluid passage 143 between the throat portion 144 to the jet port 142 is a passage expanding portion 145 in which the passage cross-sectional area is increased from the throat portion 144 to the jet port 142 of the nozzle 140. That is, the passage cross-sectional area becomes broadened from the throat portion 144 as toward downstream in the passage expanding portion 145.

The passage expanding portion 145 is configured by a middle portion 147 in which a passage wall surface defining the fluid passage 143 is expanded with a first expanding angle θ1, and an outlet portion 148 in which a passage wall surface defining the fluid passage 143 is expanded with a second expanding angle θ2. The first expanding angle θ1 is constant in the middle portion 147, and the second expanding angle θ2 of the outlet portion 148 is larger than the first expanding angle θ1 of the middle portion 147.

The second expanding angle θ2 at an upstream end of the outlet portion 148 is equal to the first expanding angle θ1 of the middle portion 147, and is gradually increased in the outlet portion 148 as toward downstream in a fluid flow direction (i.e., refrigerant flow direction). That is, the second expanding angle θ2 is gradually increased from the upstream end of the outlet portion 148 to the jet port 142 of the nozzle 140, such that the second expanding angle θ2 at the upstream end of the outlet portion 148 is the smallest angle that is the same as first expanding angle θ1, and the second expanding angle θ2 at the jet port 142 is the largest angle.

Thus, in the passage expanding portion 145 on the downstream side of the throat 144 of the fluid passage 143 of the nozzle 140, the middle portion 147 and the outlet portion 148 can be connected smoothly. In the cross section shown in FIG. 2, that is taken along a surface including the center line (i.e., axial line), the passage wall surface (i.e., inner wall surface) defining the fluid passage 143 of the middle portion 147 is a straight line, and a passage wall surface (i.e., inner wall surface) defining the fluid passage 143 of the outlet portion 148 is a smoothly covered line with a slight convex on inside.

In the nozzle 140 of the first embodiment, the diameter of the circular passage in cross section of the passage expanding portion 145 is increased as toward downstream in the fluid flow direction, while an increasing ratio of the diameter of the circular passage in cross section of the middle portion 147 is constant toward the downstream and an increasing ratio of the diameter of the circular passage in cross section of the outlet portion 148 is gradually increased as toward downstream.

Next, operation of the refrigeration cycle apparatus 10 with the above structure of the ejector 14 according to the first embodiment will be described.

When the compressor 11 is driven by a vehicle engine, high-temperature and high-pressure refrigerant compressed in and discharged from the compressor 11 flows toward the condenser 12. The high-temperature and high-pressure refrigerant is cooled and condensed in the condenser 12 by performing heat exchange with outside air. The cooled high-pressure refrigerant flowing out of the condenser 12 flows into the receiver 12a, and is separated into gas refrigerant and liquid refrigerant in the receiver 12a. Then, the separated liquid refrigerant flows from a liquid refrigerant outlet of the receiver 12a into the expansion valve 13.

A valve open degree of the expansion valve 13 is adjusted such that a superheat degree of the refrigerant at a refrigerant outlet side of the first evaporator 15 is approached to a predetermined value. That is, the expansion valve 13 is adjusted such that the superheat degree of the refrigerant at a refrigerant suction side of the compressor 11 is approached to the predetermined value. Therefore, the high-pressure refrigerant flowing from the receiver 12a is decompressed in the expansion valve 13, so as to become in a gas-liquid two-phase state. The refrigerant after passing through the expansion valve 13 is branched at a branch portion Z into a first stream flowing into the nozzle 140 of the ejector 14 and a second stream flowing into the branch passage 16. Because the throttle unit 17 and the second evaporator 18 are provided in the branch passage 16, the refrigerant flowing into the branch passage 16 from the branch portion Z passes through the throttle unit 17 and the second evaporator 18, and then is drawn into the refrigerant suction port 14b of the ejector 14. That is, the branch passage 16 has one end connected to the branch portion Z and the other end connected to the refrigerant suction port 14b of the ejector 14.

The refrigerant flowing from the branch portion Z into the nozzle 140 of the ejector 14 is decompressed and expanded in the fluid passage 143 of the nozzle 140. In the nozzle 140, the pressure energy of the refrigerant is converted to the speed energy of the refrigerant, and thereby high-speed refrigerant is jet from the jet port 142 of the nozzle 140. While the refrigerant is jet from the jet port 142 of the nozzle 140, the refrigerant pressure is decompressed around the jet port 142 of the nozzle 140, so that the refrigerant (e.g., gas refrigerant) after passing through the second evaporator 18 in the branch passage 16 is drawn into the ejector 14 from the refrigerant suction port 14b.

The refrigerant jetted from the nozzle 140 and the refrigerant drawn from the refrigerant suction port 14b are mixed in the mixing portion 14c and flows into the diffuser portion 14d. Because the passenger sectional area of the diffuser portion 14d is enlarged toward the downstream end of the ejector 14, the speed energy of the refrigerant is converted to the pressure energy of the refrigerant in the diffuser portion 14d, thereby pressurizing the refrigerant in the diffuser portion 14d.

Low-temperature and low-pressure refrigerant flowing out of the diffuser portion 14d of the ejector 14 flows into the first evaporator 15, and is evaporated in the first evaporator 15 by absorbing heat from air blown by the electrical blower 19.

Then the evaporated gas refrigerant after being evaporated in the first evaporator 15 is drawn into the compressor 11 to be compressed again in the compressor 11.

The refrigerant flowing into the branch passage 16 from the branch portion Z is decompressed in the throttle unit 17, and the decompressed low-pressure refrigerant flows into the second evaporator 18. In the second evaporator 18, low-pressure refrigerant is evaporated by absorbing heat from air that has passed through the first evaporator 15. The gas refrigerant after being evaporated in the second evaporator 18 is drawn into the ejector 14 via the refrigerant suction port 14b.

According to the refrigeration cycle apparatus 10 with a vapor-compression refrigerant cycle, the refrigerant downstream from the diffuser portion 14d of the ejector 14 can be supplied to the first evaporator 15, while the refrigerant decompressed in the throttle unit 17 of the branch passage 16 can be supplied to the second evaporator 18. Therefore, it is possible to obtain cooling action in both the first and second evaporators 15, 18, at the same time. Because the air cooled by both the first and second evaporators 15, 18 is blown into the space to be cooled (e.g., a vehicle compartment, a space of a refrigerator), the cooling capacity for cooling the space to be cooled can be effectively improved in the refrigeration cycle apparatus 10.

According to the present embodiment, the passage expanding portion 145 of the nozzle 140 is provided with the middle portion 147 and the outlet portion 148 in this order in the refrigerant flow direction of the fluid passage 143. In the passage expanding portion 145 of the nozzle 140, the passage wall surface of the middle portion 147 is expanded by the constant first expanding angle $\theta 1$ toward downstream, and the passage wall surface of the outlet portion 148 from the downstream end of the middle portion 147 to the jet port 142 is expanded by the second expanding angle $\theta 2$. The second expanding angle $\theta 2$ of the outlet portion 148 of the passage expanding portion 145 is equal to the first expanding angle $\theta 1$ at the downstream end of the middle portion 147, and is gradually increased toward downstream in the outlet portion 148 of the passage expanding portion 145, in the nozzle 140.

While the gas-liquid two-phase refrigerant flowing into the throat portion 144 of the nozzle 140 is decompressed in the passage expanding portion 145 of the nozzle 140, the two-phase refrigerant from the expansion valve 13 is boiled from its fine bubbles, and thereby the gas amount in the fluid (i.e., the refrigerant) at the outlet portion 148 becomes larger in accordance with the decompression. The expanding angle $\theta 2$ of the outlet portion 148 is made larger than the extending angle $\theta 1$ of the middle portion 147 of the nozzle 140 to correspond to the increased gas amount, and thereby the increase ratio of the passage cross-sectional area of the outlet portion 148 becomes larger as compared with the middle portion 147.

In the outlet portion 148 of the passage expanding portion 145, the expanding angle $\theta 2$ is gradually increased toward downstream so that the passage inner wall surface of the outlet portion 148 is a smoothly covered surface, and the downstream end portion of the middle portion 147 is smoothly connected to the outlet portion 148 in the passage expanding portion 145 of the nozzle 140.

Thus, it is easy for the refrigerant to be smoothly accelerated in the passenger expanding portion 145, and thereby stably improving a nozzle efficiency that is an efficiency for converting the pressure energy of the refrigerant to the speed energy of the refrigerant in the nozzle 140. As a result, the ejector efficiency can be improved, thereby improving the coefficient of performance (COP) of the refrigerant cycle in the refrigeration cycle apparatus 10.

Figure 4A:
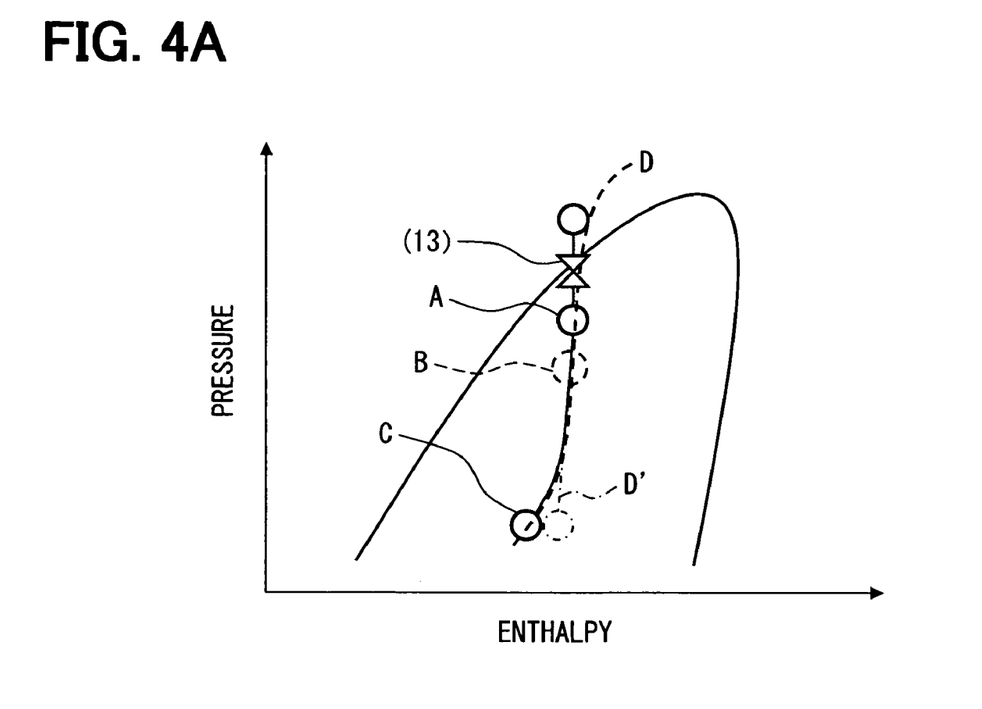
FIG. 4A is a graph for explaining a decompression state of the nozzle according to the first embodiment in a pressure-enthalpy Mollier diagram.
Figure 4B:
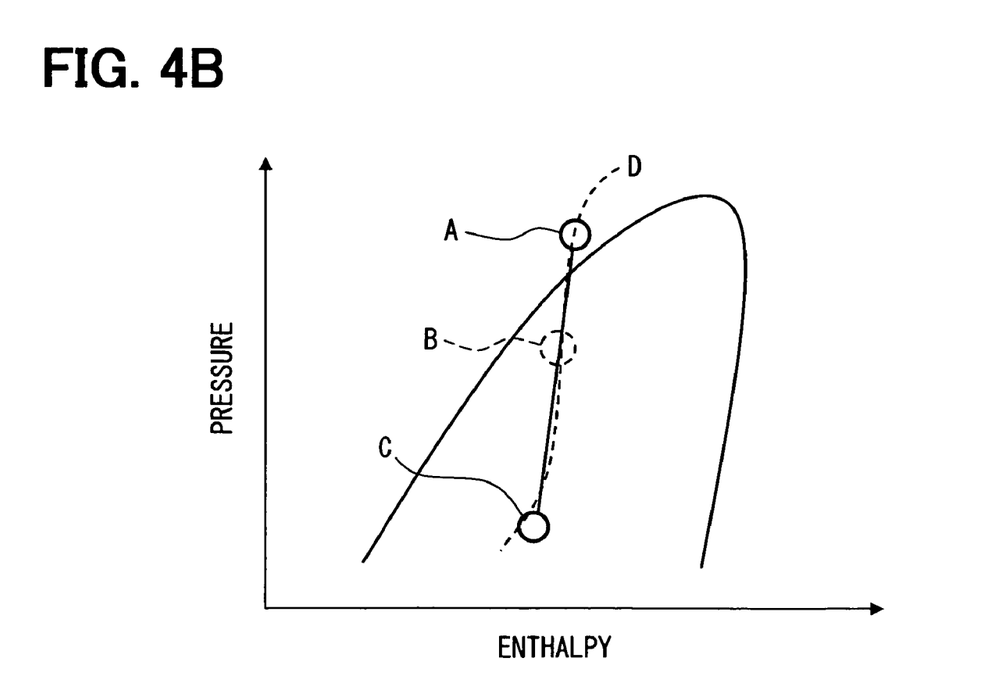
FIG. 4B is a graph for explaining a decompression state of a nozzle in a comparison example in the pressure-enthalpy Mollier diagram.

FIG. 4A is a graph showing a refrigerant state in the nozzle 140 of the ejector 14 according to the first embodiment, and FIG. 4B is a graph showing a refrigerant state in a nozzle of an ejector in a comparison example in which an expanding angle of a passage expanding portion from the throat to the jet port of the nozzle is made constant. Furthermore, in FIG. 4B, generally, liquid refrigerant is introduced into the inlet of the nozzle 140. In FIGS. 4A and 4B, A indicates a refrigerant state at the nozzle inlet, B indicates a refrigerant state at the nozzle throat portion, C indicates a refrigerant state at the nozzle outlet (i.e., jet port). When the refrigerant is decompressed along the iso-entropy line D, the nozzle efficiency can be increased. As shown in FIG. 4B, because the liquid refrigerant is decompressed in the nozzle, the decompression amount of the nozzle is larger. Thus, even when the expanding angle of the passage expanding portion from the throat portion to the outlet (jet port) of the nozzle is made constant, it is possible to easy decompress the refrigerant in the nozzle along the iso-entropy line D on a relatively high-pressure side.

In contrast, in the present embodiment, the refrigerant before flowing into the nozzle 140 is decompressed and expanded by the expansion valve 13 to be in a gas-liquid two-phase state. In this case, the decompression amount in the passage expanding portion 145 is relatively small, and thereby the refrigerant decompression in the nozzle 140 is performed in a relatively low pressure area.

As shown in FIG. 4A, on a low pressure side on which the passage expanding portion 145 decompresses the refrigerant, the iso-entropy line D is turned to the left side (i.e., enthalpy reducing side). If the passage expanding portion having the constant expanding angle is used on the low pressure side, the decompression is performed in the nozzle along the chain line D', and is shifted from the iso-entropy line D, thereby increasing the entropy.

According to the nozzle 140 of the ejector 14 of the first embodiment, the expanding angle $\theta 2$ of the outlet portion 148 of the passage expanding portion 145 is made larger than the expanding angle $\theta 1$ of the middle portion 147 of the passage expanding portion 145, so that the expanding ratio of the passage cross-sectional area of the outlet portion 148 is made larger than that of the middle portion 147. Thus, the refrigerant decompression can be performed substantially along the iso-entropy line D, without causing a flow separation from the passage expanding portion 145 or a scroll flow in the passage expanding portion 145. Thus, it is possible to easily accelerate the refrigerant in the passage expanding portion 145, and thereby obtaining a high stable nozzle efficiency.

According to experiments by the inventors of the present application, when a ratio ($\theta 2/\theta 1$) of the expanding angle $\theta 2$ at the jet port 142 of the downstream end of the outlet portion 148 to the expanding angle $\theta 1$ of the middle portion 147 is set equal to or larger than 1.33, the refrigerant (fluid) can be easily accelerated in the passage expanding portion 145 of the nozzle 140, thereby stably improving the nozzle efficiency.

Figure 5:
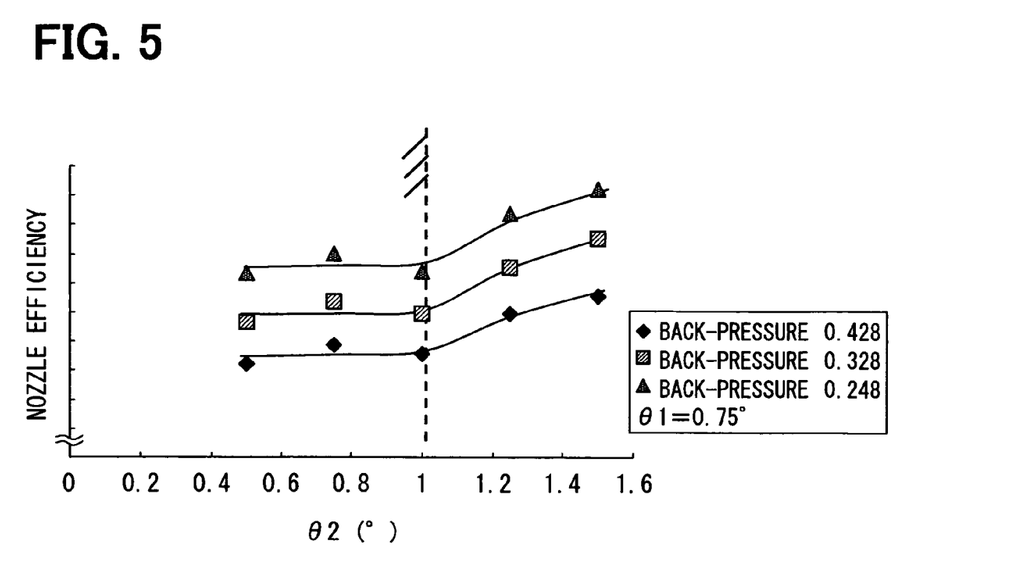
FIG. 5 is a graph showing relationships between a nozzle efficiency and nozzle conditions.

FIG. 5 shows experimental results performed by the inventors of the present application, when the refrigerant at the inlet 141 of the nozzle 140 is in a gas-liquid two-phase state at a constant pressure, and when the outlet pressure (i.e., back pressure) of the nozzle 140 is changed in a range of 0.248 MPa to 0.428 MPa in accordance with outside environmental conditions of the evaporator 15 located downstream of the ejector 14.

In the experiments of FIG. 5, the first expanding angle $\theta 1$ is set at 0.75°, and the second expanding angle $\theta 2$ is changed in a range between 0.5°-1.5°. When the second expanding angle $\theta 2$ is 0.5°, it is a comparison example in which the second expanding angle θ2 is smaller than the first expanding angle θ1. When the second expanding angle θ2 is 0.75°, it is a comparison example in which the second expanding angle θ2 is equal to the first expanding angle θ1 so that the passage expanding portion is enlarged with a constant expanding angle.

As shown in FIG. 5, when the second expanding angle θ2 is in a range between 0.5° and 1°, the nozzle efficiency is approximately equal. When the second expanding angle θ2 at the jet port of the nozzle is equal to or larger than 1°, the ratio (θ2/θ1) becomes equal to or larger than 1.33, thereby improving the nozzle efficiency as compared with the comparison example.

Figure 6:
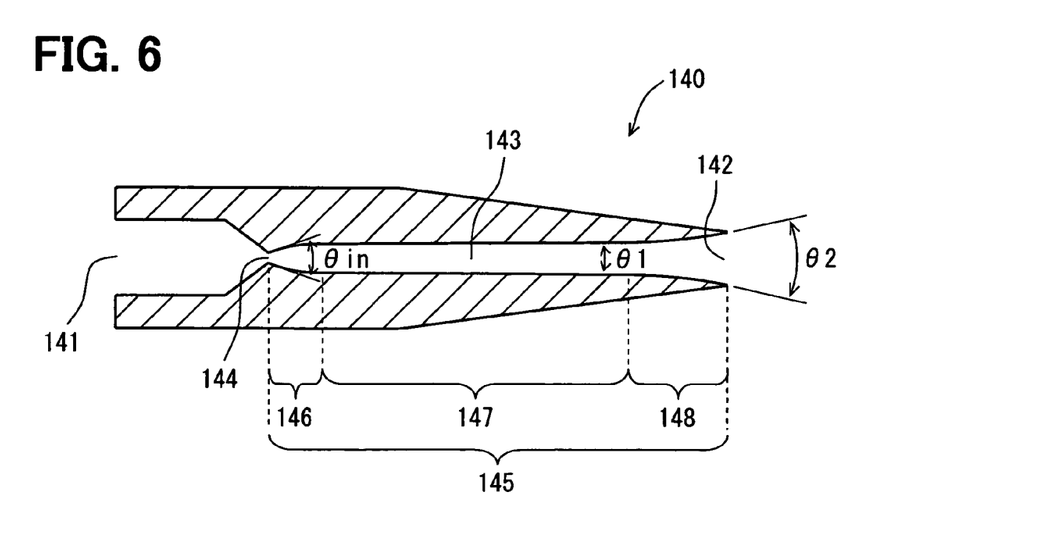
FIG. 6 is a cross-sectional view showing a nozzle for an ejector according to a modification of the first embodiment of the present invention.

FIG. 6 shows another example of the first embodiment, in which a passage expanding portion 145 from the throat portion 144 to the jet port 142 is configured by an introduction portion 146, a middle portion 147 and an outlet portion 148 which are provided in this order from the throat portion 144 to the jet port 142. The passage wall surface of the introduction port 146 from the throat portion 144 to the middle portion 147 is enlarged by an expanding angle θin that is set equal to or larger than first expanding angle θ1. Thus, in the example shown in FIG. 6 of the first embodiment of the present invention, the expanding angle θin of the introduction portion 146 is set to be gradually reduced toward downstream in the introduction portion 146, so that the passage wall surface of the introduction portion 146 is a smoothly curved surface in the refrigerant flow direction and the downstream end of the introduction portion 146 is smoothly connected to the upstream end of the middle portion 147.

Thus, in the passage expanding portion 145 downstream of the throat portion 144 of the fluid passage 143 in the example of FIG. 6, the introduction portion 146, the middle portion 147 and the outlet portion 148 can be smoothly connected to each other. In a passage section of the fluid passage 143 including the passage center line, as shown in FIG. 6, the passage wall surface (i.e., inner wall surface) of the introduction portion 146 becomes in a curved line slightly protruding toward radially outside, the passage wall surface (i.e., inner wall surface) of the middle portion 147 becomes in a straight line, and the passage wall surface (i.e., inner wall surface) of the outlet portion 148 becomes in a curved line slightly protruding toward inside, which are smoothly connected to each other.

Thus, in the nozzle 140 shown in FIG. 6, the diameter of the circular cross section of the fluid passage 143 in the passage expanding portion 145 is increased toward downstream. An increase ratio of the diameter of the circular cross section of the fluid passage 143 is gradually reduced in the introduction portion 146 as toward downstream, an increase ratio of the diameter of the circular cross section of the fluid passage 143 is constant in the whole area of the middle portion 147, and an increase ratio of the diameter of the circular cross section of the fluid passage 143 is gradually increased in the outlet portion 148 as toward downstream.

Thus, the refrigerant flowing into the throat portion 144 of the nozzle 140 is expanded first at the introduction portion 146, before flowing into the middle portion 147.

When the refrigerant flowing into the throat portion 144 is decompressed in the passage expanding portion 145 of the nozzle 140, the gas amount contained in the refrigerant is rapidly increased first in the introduction portion 146 at a portion immediately after passing through the throat portion 144. In the example of the nozzle 140 shown in FIG. 6, the expanding angle θ in of the introduction portion 146 is generally made larger than the expanding angle θ1 so that an increase ratio of the passage cross-sectional area of the introduction portion 146 is made larger than an increase ratio of the passage cross-sectional area of the middle portion 147. Therefore, the refrigerant can more smoothly flow in the passage expanding portion 145, thereby further improving the nozzle efficiency. That is, the expanding angle θ1 of the middle portion 147 may be gradually increased without being limited to the constant expanding angle.

In the examples of the nozzle 140 shown in FIGS. 2 and 6, the passage wall surface of the middle portion 147 in the section including the center line of the fluid passage 143 may be formed into a curved line without being limited to the straight line.

(Second Embodiment)

Figure 7:
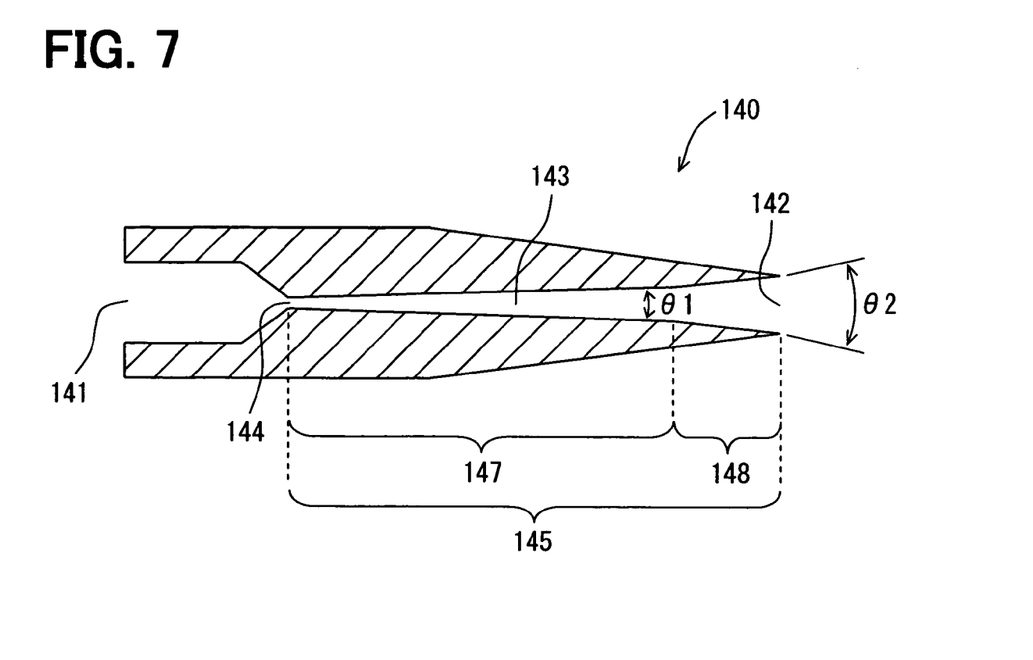
FIG. 7 is a cross-sectional view showing a nozzle for an ejector according to a second embodiment of the present invention.
Figure 8:
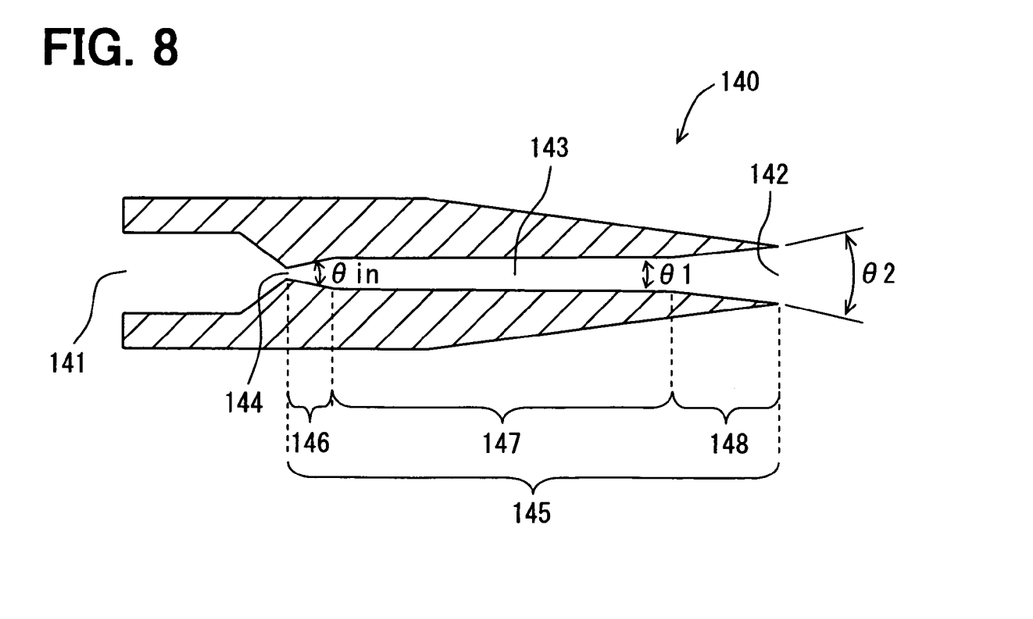
FIG. 8 is a cross-sectional view showing a nozzle for an ejector according to a modification of the second embodiment of the present invention.

A second embodiment of the present invention will be described with reference to FIGS. 7 and 8. FIG. 7 is one example of a nozzle 140 according to the second embodiment, and FIG. 8 is another example of a nozzle 140 of the second embodiment. In FIGS. 7 and 8, parts having the same or corresponding functions in the nozzle 140 as those of the first embodiment are indicated by the same reference numbers.

In the example of the nozzle 140 of FIG. 7 in which the fluid passage 143 from the throat portion 144 to the jet port 142 is configured by a middle portion 148 and an outlet portion 148, the expanding angle θ1 of the passage wall surface of the middle portion 147 is constant in the whole area, and the expanding angle θ2 of the passage wall surface of the outlet portion 148 is also constant in the whole area while being larger than the expanding angle θ1 of the middle portion 147. That is, the expanding angle θ2 of the outlet portion 148 larger than the expanding angle θ1 of the middle portion 147 can be set constant in the whole passage area.

On the other hand, in the example of the nozzle 140 of FIG. 8, in which the fluid passage 143 from the throat portion 144 to the jet port 142 is configured by an introduction portion 146, a middle portion 147 and an outlet portion 148 in this order in the refrigerant flow direction. Furthermore, the expanding angle θin of the passage wall surface of the introduction portion 146 is constant in the whole area, the expanding angle θ1 of the middle portion 147 is constant in the whole area, and the expanding angle θ2 of the outlet portion 148 is also constant in the whole area. Furthermore, the expanding angle θ2 of the outlet portion 148 is larger than the expanding angle θ1 of the middle portion 147, and the expanding angle θin of the introduction portion 146 is larger than the expanding angle θ1 of the middle portion 147.

Thus, in the examples of the nozzle 140 shown in FIGS. 7 and 8, each passage wall surface of the introduction portion 146, the middle portion 147 and the outlet portion 148 in the section including the center line of the fluid passage 143 becomes in the straight line.

Thus, the nozzle 140 according to the second embodiment can be easily formed as compared with the first embodiment.

In the second embodiment, the other parts of the ejector 14 used in the refrigeration cycle apparatus may be similar to those of the above-described first embodiment.

(Other Embodiments)

Although the present invention has been fully described in connection with the preferred embodiments thereof with reference to the accompanying drawings, it is to be noted that various changes and modifications will become apparent to those skilled in the art.

For example, in the above-described embodiments and the modifications thereof, the ejector 14 having the nozzle 140 is described as an ejector device. The present invention may be applied to a nozzle 140 having a needle valve.

Figure 9:
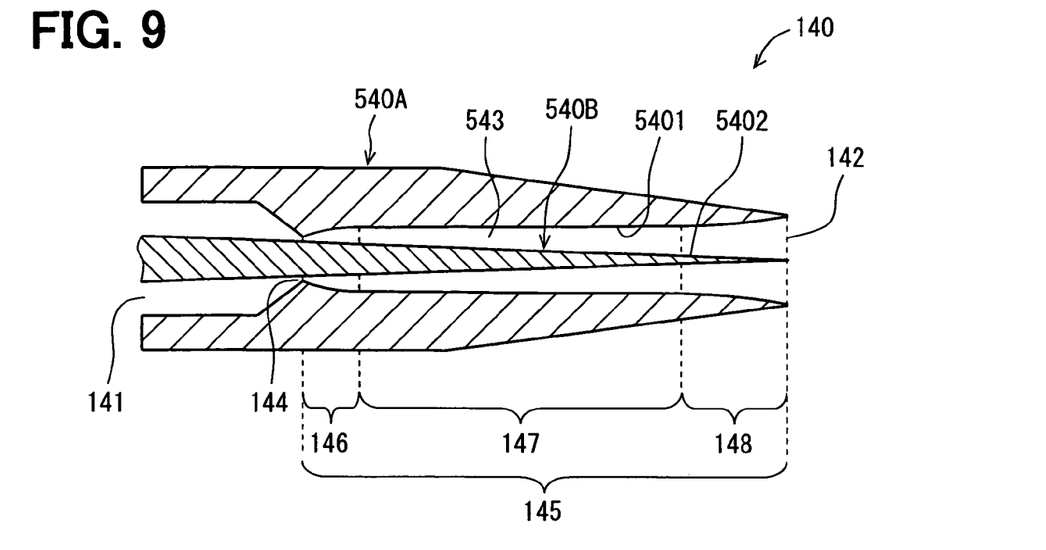
FIG. 9 is a cross-sectional view showing a nozzle for an ejector according to another embodiment of the present invention.

FIG. 9 shows an example of a nozzle 140 provided with a nozzle body 540A, and a needle valve 540B inserted in the nozzle body 540A. The nozzle 140 is configured to decompress gas-liquid two-phase refrigerant flowing into the throat portion 144, and to discharge the compressed refrigerant from the jet port 142. The nozzle body 540A has therein a fluid passage 543, and the passage cross-sectional area of the fluid passage 543 becomes smallest at the throat portion 144. The needle valve 540B is inserted into the fluid passage 543 from the inlet 141 to the jet port 142 that is a downstream end of the fluid passage 543, as shown in FIG. 9.

Thus, the fluid passage 543 is defined by an inner wall surface 5401 of the nozzle body 540A and an outer wall surface 5402 of the needle valve 540B, from the inlet 141 to the outlet 142 of the nozzle 140. If the fluid passage 543 from the throat portion 144 to the jet port 142 is supposed as a cylindrical virtual fluid passage having respectively corresponding circular cross section, the virtual fluid passage is a passage expanding shape in which the passage cross-section area is enlarged downstream from the throat portion 144 to the jet port 142 of the nozzle 140. Even in the example of FIG. 9, the expanding angle θ1 of the middle portion 147 on the passage surface of the virtual fluid passage corresponding to the fluid passage 543 is made smaller than the expanding angle θ2 of the outlet portion 148 on the passage surface of the virtual fluid passage corresponding to the fluid passage 543. The expanding angle θ1 of the middle portion 147 on the passage surface of the virtual fluid passage corresponding to the fluid passage 543 may be constant in the whole area of the middle portion 147, and the expanding angle θ2 of the outlet portion 148 on the passage surface of the virtual fluid passage corresponding to the fluid passage 543 may be also constant in the whole area of the outlet portion 148.

In the example of FIG. 9, the expanding angle θ2 of the outlet portion 148 on the passage surface of the virtual fluid passage corresponding to the fluid passage 543 is gradually increased toward downstream in the outlet portion 148.

Furthermore, in the example of FIG. 9, the introduction portion 146 is provided between the throat portion 144 and the middle portion 147, and the expanding angle θin of the introduction portion 146 on the passage surface of the virtual fluid passage corresponding to the fluid passage 543 is set larger than the expanding angle θ1 of the middle portion 147 on the passage surface of the virtual fluid passage corresponding to the fluid passage 543. The expanding angle θ in of the introduction portion 146 on the passage surface of the virtual fluid passage corresponding to the fluid passage 543 may be gradually reduced toward downstream.

The nozzle 140 shown in FIG. 9 may be used for the ejector 14 of a refrigeration cycle apparatus. Even in this case, the increase ratio of the passage cross-sectional area of the fluid passage 543 of the outlet portion 148 is made larger than that in the middle portion 147, so that the refrigerant can be more easily accelerated in the fluid passage 543 at a downstream side of the throat portion 144. Thus, the nozzle efficiency can be stably improved. Furthermore, the increase ratio of the passage cross-sectional area of the fluid passage 543 of the introduction portion 146 is made larger than that in the middle portion 147, so that the refrigerant can be more easily accelerated in an area immediately after the throat portion 144. Thus, the nozzle efficiency can be stably improved.

In the example of the nozzle 140 shown in FIG. 9, an expanding angle of the inner wall surface 540 of the nozzle body 540A is changed while a taper angle of the outer wall surface 5402 of the needle valve 540B is set constant, so as to form the fluid passage 543 with the above configuration of the virtual fluid passage. However, the fluid passage 543 with the above configuration of the virtual fluid passage may be formed without being limited to the combination of the nozzle body 540A and the needle valve 540B shown in FIG. 9.

Figure 10:
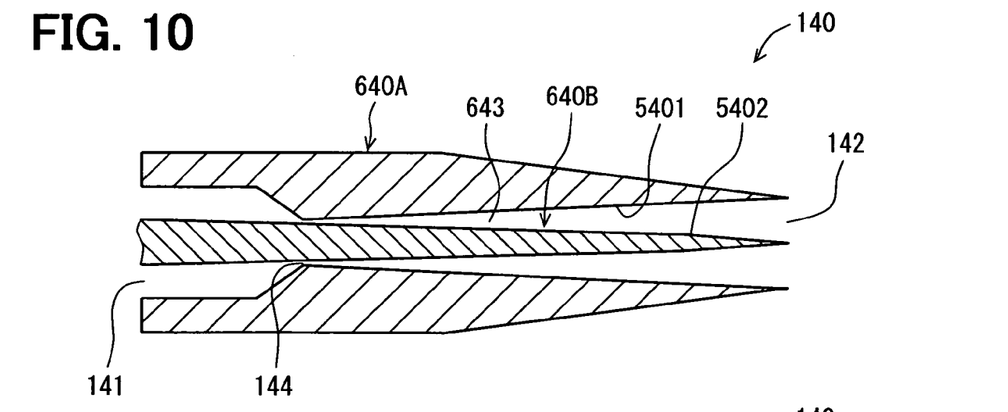
FIG. 10 is a cross-sectional view showing a nozzle for an ejector according to another embodiment of the present invention.

For example, in an example of a nozzle 140 of FIG. 10, an expanding angle of the inner wall surface 5401 of a nozzle body 640A is made constant, while a taper angle of an outer wall surface 5402 of a needle valve 640B is changed in a fluid flow direction (e.g., refrigerant flow direction). A fluid passage 643 is defined in the nozzle 140 between the inner wall surface 5401 of the nozzle body 640A and the outer wall surface 5402 of the needle valve 640B. The virtual fluid passage with respective circular cross sections corresponding to the fluid passage 643 is set to have the same configuration as that of the fluid passage 543 shown in FIG. 9.

Figure 11:
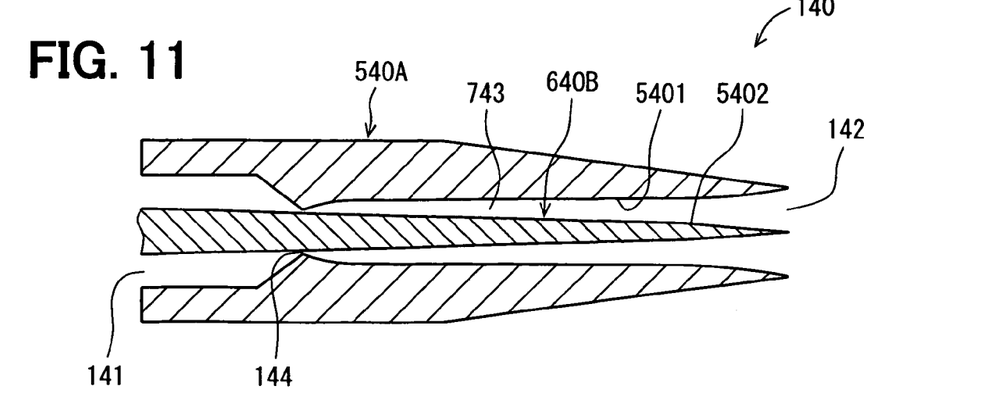
FIG. 11 is a cross-sectional view showing a nozzle for an ejector according to another embodiment of the present invention.

FIG. 11 shows another example of a nozzle 140 according to the present invention. In the nozzle 140 shown in FIG. 11, both the extending angle of the inner wall surface 5401 of the valve body 540A and the taper angle of the outer wall surface of the needle valve 640B are changed in the fluid flow direction, so as to form a fluid passage 743 having the above configuration of the virtual fluid passage between the inner wall surface 5401 of the nozzle body 540A and the outer wall surface 5402 of the needle valve 640B.

According to any one nozzle 140 of the examples shown in FIGS. 9 to 11 of the present invention, the expanding angle of the passage surface of the virtual fluid passage in the outlet portion 148 can be gradually increased toward downstream so that the fluid can be smoothly accelerated in the outlet portion 148 and the nozzle efficiency can be stably improved. Furthermore, the expanding angle of the passage surface of the virtual fluid passage in the introduction portion 146 can be gradually reduced toward downstream from the throat portion 144 to the upstream end of the middle portion 147, so that the fluid can be smoothly accelerated and the nozzle efficiency can be stably improved.

In the section of the nozzle 140 shown in FIGS. 9 to 11 on a surface including the center line, the inner wall surface 5401 of the valve body 540A, 640A or/and the outer wall surface 5402 of the needle valve 540B, 640B can be formed by combining straight line portions of respective parts. If the needle valve 540B has a constant taper angle, the needle valve 540B can be easily formed, and thereby the nozzle 140 can be easily formed.

In the above-described embodiments, the nozzle 140 of the ejector 14 is used such that the gas-liquid two-phase refrigerant flows into the inlet 141 of the nozzle 140. However, in a case where gas-liquid two-phase refrigerant flows into the throat portion 144 of the nozzle 140 of the ejector 14, the advantages of the present invention can be effectively obtained.

In the above-described embodiments and modifications of the present invention, the nozzle 140 of the ejector 14 is typically used for the refrigeration cycle apparatus 10 shown in FIG. 3 in which the branch passage 16 is branched from the branch portion Z at an upstream side of the nozzle 140. However, the ejector 14 having the nozzle 140 according to any one example in the present invention can be suitably used for a refrigeration cycle apparatus shown in FIG. 12 or a refrigeration cycle apparatus shown in FIG. 13, for example.

Figure 12:
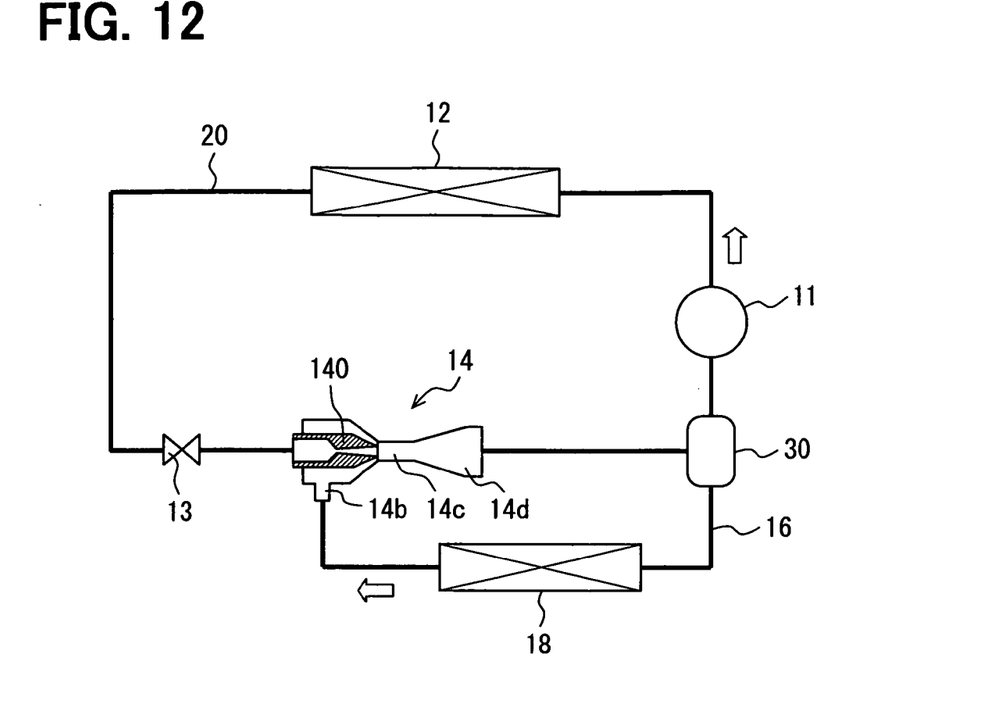
FIG. 12 is a schematic diagram showing a refrigeration cycle apparatus with an ejector according to another embodiment of the present invention.
Figure 13:
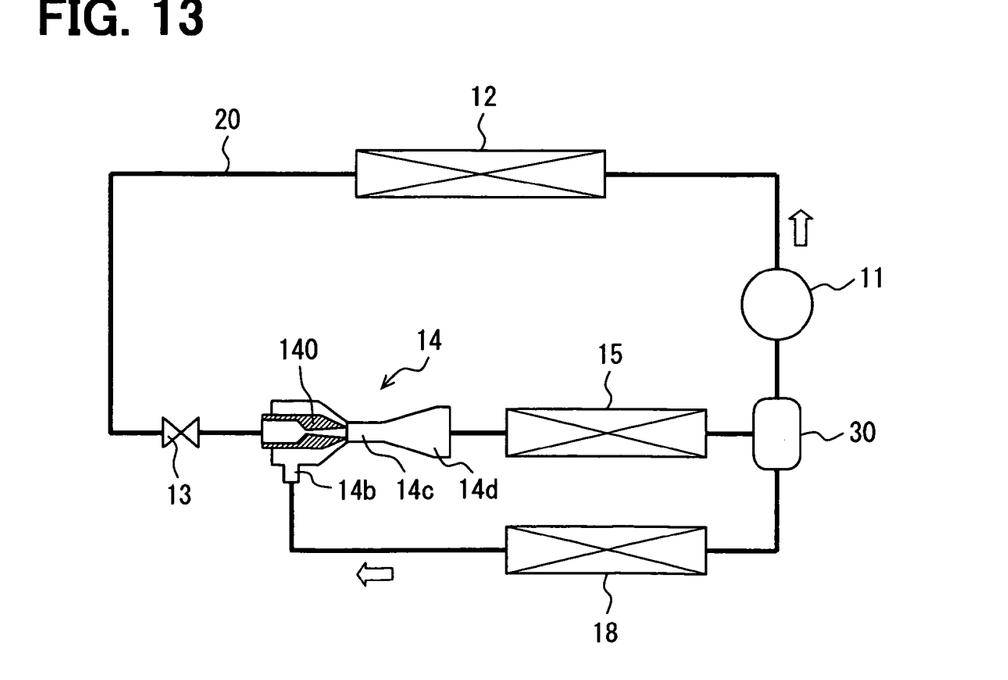
FIG. 13 is a schematic diagram showing a refrigeration cycle apparatus with an ejector according to another embodiment of the present invention.

The refrigeration cycle apparatus shown in FIG. 12 includes a compressor 11 configured to compress the refrigerant and discharge the compressed refrigerant, a refrigerant radiator (gas cooler) 12 configured to cool the refrigerant discharged from the compressor, an expansion valve 13 configured to decompress and expand the refrigerant flowing from the radiator 12 into a gas-liquid two-phase state, and the ejector 14. A gas-liquid separator 30 used as an accumulator may be located at a downstream side of the ejector 14. The gas-liquid separator 30 has a liquid refrigerant outlet connected to one end of a branch passage 16, and a gas refrigerant outlet coupled to the refrigerant suction side of the compressor 11. The other end of the branch passage 16 is connected to the refrigerant suction port 14b of the ejector 14 so that separated liquid refrigerant flows into an evaporator 18 in the branch passage 16, and the evaporated gas refrigerant of the evaporator 18 is drawn into the refrigerant suction port 14b of the ejector 14. In the refrigeration cycle apparatus shown in FIG. 13, an evaporator 15 is further provided between the outlet of the ejector 14 and a refrigerant inlet of the gas-liquid separator 30 in the structure of the refrigeration cycle apparatus of FIG. 12. Even in the refrigeration cycle apparatuses shown in FIGS. 12 and 13, the advantages of the ejector 14 with the nozzle 140 can be effectively obtained.

Figure 14:
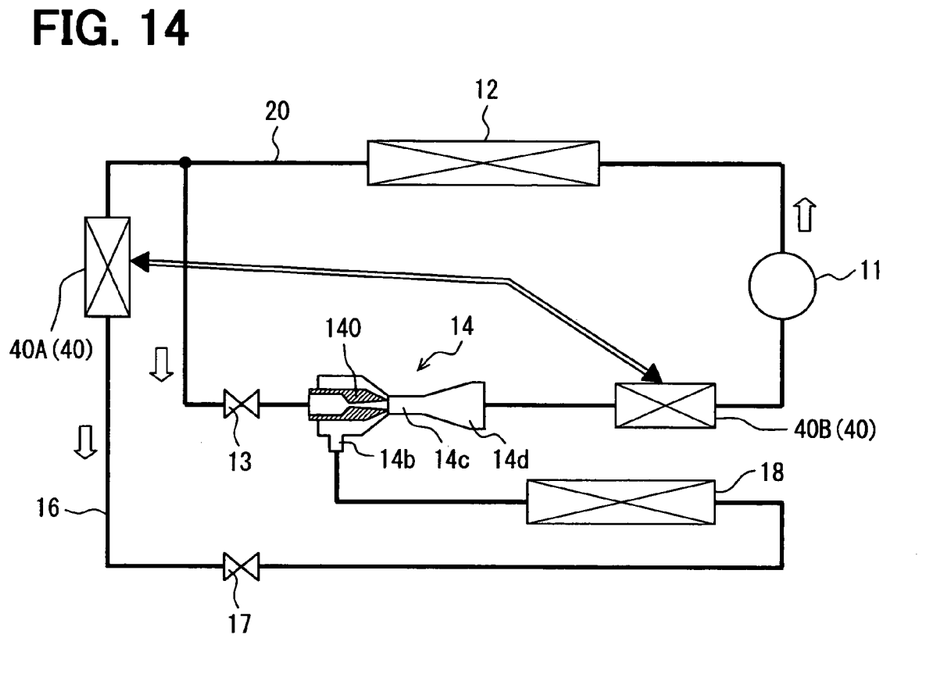
FIG. 14 is a schematic diagram showing a refrigeration cycle apparatus with an ejector according to another embodiment of the present invention.

Alternatively, the ejector 14 having the nozzle 140 can be used for a refrigeration cycle apparatus without the liquid receiver 12a in the refrigeration cycle apparatus of FIG. 3. Alternatively, the ejector 14 having the nozzle 140 can be used for a refrigerant cycle device shown in FIG. 14 or 15. In the refrigeration cycle apparatus shown in FIG. 14, a compressor 11 is configured to compress the refrigerant and to discharge the compressed refrigerant, and a refrigerant radiator 12 (gas cooler) is located downstream of the compressor 11 to cool the refrigerant discharged from the compressor 11. The refrigerant flowing out of the refrigerant radiator 12 is divided into two refrigerant streams. One of the branched refrigerant stream flows into the nozzle 140 of the ejector 14 after passing through an expansion valve 13, and the other one of the branched refrigerant stream flows into the refrigerant suction port 14b of the ejector 14 through a branch passage 16. A throttle unit 17 and an evaporator 18 are located in the branch passage 16. An inner heat exchanger 40 is located such that high-pressure refrigerant flowing through a high-pressure refrigerant passage 40A of the inner heat exchanger 40 is heat-exchanged with low-pressure refrigerant flowing through a low-pressure refrigerant passage 40B of the inner heat exchanger 40. As shown in FIG. 14, the high-pressure refrigerant passage 40A of the inner heat exchanger 40 is located in the branch passage 16 at an upstream side of the expansion valve 17, and the low-pressure refrigerant passage 40B is located between the outlet of the ejector 14 and the refrigerant suction side of the compressor 11.

Figure 15:
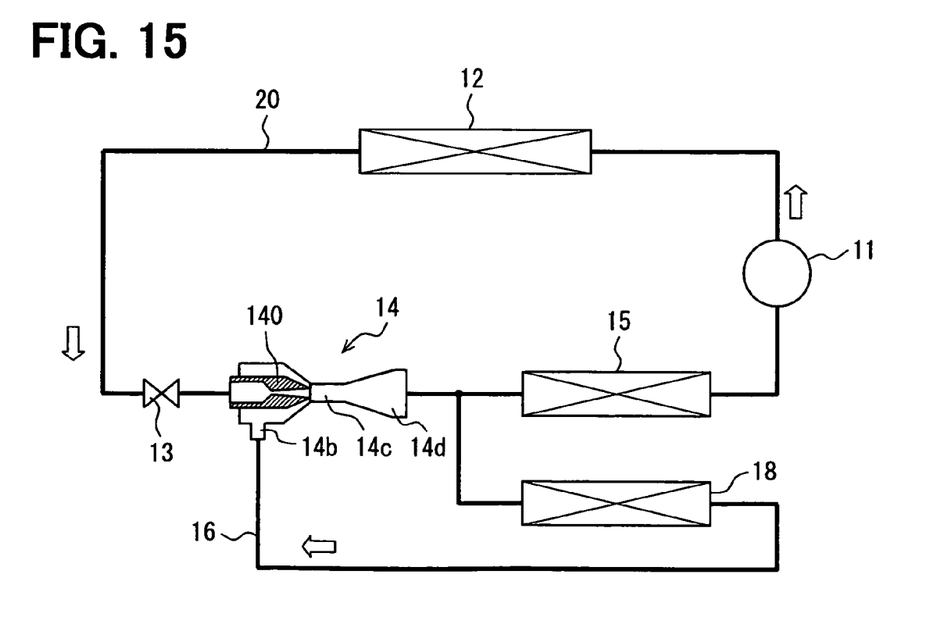
FIG. 15 is a schematic diagram showing a refrigeration cycle apparatus with an ejector according to another embodiment of the present invention.

The refrigeration cycle apparatus shown in FIG. 15 includes a compressor 11 configured to decompress the refrigerant and to discharge the compressed refrigerant, a refrigerant radiator 12 configured to cool the refrigerant discharged from the compressor 11, an expansion valve 13 located to decompress the refrigerant flowing out of the radiator 12, and a first evaporator 15 located downstream of the ejector 14. The refrigerant outlet of the first evaporator 15 is connected to the refrigerant suction side of the compressor 11. A branch portion is located in a refrigerant passage between the outlet of the ejector 14 and a refrigerant inlet of the first evaporator 15. One end of a branch passage 16 is connected to the branch portion and the other end of the branch passage 16 is connected to the refrigerant suction port 14b of the ejector 14 so that the refrigerant downstream from the outlet of the ejector 14 is drawn into the refrigerant suction port 14b of the ejector 14. In the refrigeration cycle apparatus shown in FIG. 15, a second evaporator 18 is located in the branch passage 16.

In the above-described any refrigeration cycle apparatus in which the ejector 14 having the nozzle 140 is used, a liquid receiver or/and an accumulator generally known may be used, or both the liquid receiver and the accumulator may be omitted. That is, the ejector 14 having the nozzle 140 can be suitably used for any refrigeration cycle apparatus that includes a compressor (11) configured to compress the refrigerant and to discharge the compressed refrigerant, a refrigerant radiator (12) configured to cool the refrigerant flowing from the compressor (11), and an evaporator (15, 18) configured to evaporate the refrigerant to be drawn into the refrigerant suction port 14b of the ejector 14. Preferably, the refrigeration cycle apparatus further includes a decompression device (13) configured to decompress the refrigerant from the refrigerant radiator (12) into a gas-liquid two-phase refrigerant. In this case, the nozzle 140 is coupled to the decompression device (13) such that the gas-liquid two-phase refrigerant flows into the throat portion 144 of the nozzle 140 from the inlet 141. In the refrigeration cycle apparatus, the other components and configuration thereof may be suitably changed without being limited to the examples described above.

In the above-described first embodiment, an example in which the refrigeration cycle apparatus is mounted to a vehicle is described. However, the refrigeration cycle apparatus can be used for the other use and may be stably fixed at a certain place.

In the above-described first embodiment, HFC-134a is used as one example of the refrigerant. However, as the refrigerant, any Freon-based refrigerant, a hydrocarbon-based refrigerant, carbon dioxide, ethylene, ethane, nitrogen oxide, or the like, which are generally used, may be used. For example, hydrocarbon-based refrigerant such as propane, or mixing refrigerant such as HFC-404A, HFC-407 or HFC-410 can be used. In the refrigeration cycle apparatus, the refrigerant cycle may be a super-critical refrigerant cycle in which the high-pressure side refrigerant pressure excesses the critical pressure of the refrigerant, or may be a sub-critical refrigerant cycle in which the high-pressure side refrigerant pressure does not excess the critical pressure of the refrigerant.

When the ejector 14 having the nozzle 140 is used in the refrigerant cycle, a fluid flowing in the nozzle 140 and a fluid drawn into the ejector 14 from the refrigerant suction port 14b are the refrigerant circulating in the refrigerant cycle. However, the ejector 14 having the nozzle 140 may be used for an ejector device in which a fluid flows into the throat portion 144 of the nozzle 140 in the ejector 14. When a gas-liquid two-phase refrigerant flows into the throat portion 144 of the nozzle 140 in the ejector 14, the increase effect of the nozzle efficiency can be made more significant.

Such changes and modifications are to be understood as being within the scope of the present invention as defined by the appended claims.

What is claimed is:
1. An ejector device comprising
a nozzle configured to decompress and expand refrigerant, the nozzle having an inner wall surface defining a fluid passage extending from an inlet to a jet port of the nozzle, and
a suction port from which refrigerant is drawn by using a jet flow of the refrigerant jetted from the nozzle; wherein
the fluid passage is a circular shape in a cross section perpendicular to an axial line of the fluid passage,
the fluid passage has a throat portion at a position between the inlet and the jet port, at which a cross-sectional area of the fluid passage becomes smallest, and a passage expanding portion in which the cross-sectional area of the fluid passage is enlarged from the throat portion as toward downstream to decompress a fluid flowing into the throat portion, and the passage expanding portion includes a middle portion in which the inner wall surface is expanded in a fluid flow direction by a first expanding angle, and an outlet portion from a downstream end of the middle portion to the jet port, in which the inner wall surface is expanded in the fluid flow direction by a second expanding angle that is larger than the first expanding angle.

2. The ejector device according to claim 1, wherein the second expanding angle in the outlet portion is gradually increased as toward downstream in the fluid flow direction.

3. The ejector device according to claim 1, wherein the second expanding angle is constant in the whole area of the outlet portion.

4. The ejector device according to claim 1, wherein a ratio of the second expanding angle at the jet port of the outlet portion to the first expanding angle is equal to or larger than 1.33.

5. The ejector device according to claim 1, wherein
the passage expanding portion further includes an introduction portion provided from the throat portion to an upstream end of the middle portion in the fluid flow direction, and
the inner wall surface in the introduction portion is expanded in the fluid flow direction by a third expanding angle that is larger than the first expanding angle.

6. The ejector device according to claim 5, wherein the third expanding angle is gradually reduced in the introduction portion as toward downstream in the fluid flow direction.

7. The ejector device according to claim 5, wherein the third expanding angle is constant in the whole area of the introduction portion.

8. The ejector device according to claim 1, wherein the first expanding angle is constant in the whole area of the middle portion.

9. The ejector device according to claim 1, wherein the first expanding angle is gradually increased in the middle portion as toward downstream in the fluid flow direction.

10. The ejector device according to claim 1, wherein the nozzle is configured to decompress a gas-liquid two-phase fluid flowing into the throat portion.

11. An ejector device comprising
a nozzle configured to decompress and expand refrigerant, the nozzle having therein a fluid passage extending from an inlet to a jet port of the nozzle, and
a suction port from which refrigerant is drawn by using a jet flow of the refrigerant jetted from the nozzle; wherein
the fluid passage has a throat portion at a position between the inlet and the jet port, at which a cross-sectional area of the fluid passage becomes smallest,
the nozzle includes a nozzle body having an inner wall surface, and a needle valve inserted in the fluid passage from the inlet toward the jet port,
the inner wall surface of the nozzle body and an outer wall surface of the needle valve are configured to define a passage expanding portion of the fluid passage from the throat portion to the jet port in the nozzle,
when the passage expanding portion of the fluid passage is supposed as a virtual fluid passage with a circular cross-sectional area having a diameter corresponding to the fluid passage of the passage expanding portion in respective cross sections of the fluid passage, a passage surface of the virtual fluid passage is enlarged from the throat portion as toward downstream to decompress a fluid flowing into the throat portion, and
the passage expanding portion includes a middle portion in which the passage surface of the virtual fluid passage is expanded in a fluid flow direction by a first expanding angle, and an outlet portion from a downstream end of the middle portion to the jet port, in which the passage surface of the virtual fluid passage is expanded in the fluid flow direction by a second expanding angle that is larger than the first expanding angle.

12. The ejector device according to claim 11, wherein the second expanding angle in the outlet portion is gradually increased as toward downstream in the fluid flow direction.

13. The ejector device according to claim 11, wherein the second expanding angle is constant in the whole area of the outlet portion.

14. The ejector device according to claim 11, wherein a ratio of the second expanding angle at the jet port of the outlet portion to the first expanding angle is equal to or larger than 1.33.

15. The ejector device according to claim 11, wherein
the passage expanding portion further includes an introduction portion provided from the throat portion to an upstream end of the middle portion in the fluid flow direction, and
the passage surface of the virtual fluid passage in the introduction portion is expanded in the fluid flow direction by a third expanding angle that is larger than the first expanding angle.

16. The ejector device according to claim 15, wherein the third expanding angle is gradually reduced in the introduction portion as toward downstream in the fluid flow direction.

17. The ejector device according to claim 15, wherein the third expanding angle is constant in the whole area of the introduction portion.

18. The ejector device according to claim 11, wherein the nozzle is configured to decompress a gas-liquid two-phase fluid flowing into the throat portion.

19. The ejector device according to claim 11, wherein
the inner wall surface of the nozzle body is expanded by an expanding angle that is changed in the fluid flow direction, and
the outer wall surface of the needle valve is tapered toward downstream in the fluid flow direction by a constant taper angle.

20. The ejector device according to claim 11, wherein
the inner wall surface of the nozzle body is expanded in the fluid flow direction by an expanding angle that is constant in the fluid flow direction, and
the outer wall surface of the needle valve is tapered toward downstream in the fluid flow direction by a taper angle that is changed in the fluid flow direction.

21. The ejector device according to claim 11, wherein
the inner wall surface of the nozzle body is expanded by an expanding angle that is changed in the fluid flow direction, and
the outer wall surface of the needle valve is tapered toward downstream in the fluid flow direction by a taper angle that is changed in the fluid flow direction.

22. A refrigeration cycle apparatus comprising
the ejector device according to claim 1, in which the fluid is a refrigerant, wherein the ejector device further includes a refrigerant suction port from which gas refrigerant is drawn by a jet flow of the refrigerant jetted from the jet port of the nozzle, and a pressure increasing portion in which the refrigerant jetted from the jet port of the nozzle and the refrigerant drawn from the refrigerant suction port are mixed and a pressure of the mixed refrigerant is increased by converting a speed energy of the refrigerant to a pressure energy of the refrigerant;
a compressor configured to compress the refrigerant and to discharge the compressed refrigerant;

a refrigerant radiator configured to cool the refrigerant flowing from the compressor; and an evaporator configured to evaporate the refrigerant to be drawn into the refrigerant suction port of the ejector.

23. The refrigeration cycle apparatus according to claim 22, further comprising a decompression device configured to decompress the refrigerant from the refrigerant radiator into a gas-liquid two-phase refrigerant, wherein the nozzle is coupled to the decompression device such that the gas-liquid two-phase refrigerant flows into the throat portion of the nozzle from the inlet.

24. A refrigeration cycle apparatus comprising the ejector device according to claim 11, wherein the ejector device further includes a pressure increasing portion in which the refrigerant jetted from the jet port of the nozzle and the refrigerant drawn from the refrigerant suction port are mixed and a pressure of the mixed refrigerant is increased by converting a speed energy of the refrigerant to a pressure energy of the refrigerant;

a compressor configured to compress the refrigerant and to discharge the compressed refrigerant;

a refrigerant radiator configured to cool the refrigerant flowing from the compressor; and an evaporator configured to evaporate the refrigerant to be drawn into the refrigerant suction port of the ejector.

25. The refrigeration cycle apparatus according to claim 24, further comprising a decompression device configured to decompress the refrigerant from the refrigerant radiator into a gas-liquid two-phase refrigerant, wherein the nozzle is coupled to the decompression device such that the gas-liquid two-phase refrigerant flows into the throat portion of the nozzle from the inlet.

26. The ejector device according to claim 1, wherein the passage expanding portion is configured such that the refrigerant is decompressed substantially along an iso-entropy line in a pressure-enthalpy Mollier diagram when the refrigerant is decompressed in iso-entropy.

27. The ejector device according to claim 11, wherein the passage expanding portion is configured such that the refrigerant is decompressed substantially along an iso-entropy line in a pressure-enthalpy Mollier diagram when the refrigerant is decompressed in iso-entropy.

28. The ejector device according to claim 1, wherein the fluid passage is continuous between the inlet and the jet port of the nozzle.

29. The ejector device according to claim 11, wherein the fluid passage is continuous between the inlet and the jet port of the nozzle.

30. The ejector device according to claim 1, wherein the nozzle is a single piece nozzle.

31. The ejector device according to claim 11, wherein the nozzle is a single piece nozzle.

* * * * *